(12) United States Patent
Schell

(10) Patent No.: US 7,578,357 B2
(45) Date of Patent: Aug. 25, 2009

(54) DRIVER WITH EXTERNAL TORQUE VALUE INDICATOR INTEGRATED WITH SPINDLE LOCK AND RELATED METHOD

(75) Inventor: Craig A. Schell, Street, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/853,600

(22) Filed: Sep. 11, 2007

(65) Prior Publication Data

US 2008/0060487 A1 Mar. 13, 2008

Related U.S. Application Data

(60) Provisional application No. 60/825,339, filed on Sep. 12, 2006.

(51) Int. Cl.
*B25B 23/147* (2006.01)
*B23Q 5/20* (2006.01)

(52) U.S. Cl. ............... 173/1; 173/164; 173/176; 173/180; 173/20

(58) Field of Classification Search ............ 173/180, 173/220, 221, 164, 20, 176, 216; 81/57.26, 81/463, 464, 465, 466
See application file for complete search history.

(56) References Cited

U.S. PATENT DOCUMENTS

| | | | | |
|---|---|---|---|---|
| 4,249,435 A | * | 2/1981 | Villeneuve et al. | 81/477 |
| 4,540,318 A | | 9/1985 | Hornung et al. | |
| 5,025,903 A | * | 6/1991 | Elligson | 192/83 |
| 5,451,127 A | * | 9/1995 | Chung | 408/20 |
| 5,535,867 A | * | 7/1996 | Coccaro et al. | 192/56.1 |
| 5,788,021 A | * | 8/1998 | Tsai | 188/67 |
| 5,984,022 A | | 11/1999 | Harman, Jr. et al. | |
| 6,095,020 A | * | 8/2000 | Rinner | 81/475 |
| 6,152,242 A | * | 11/2000 | Chung | 173/48 |
| 6,311,787 B1 | * | 11/2001 | Berry et al. | 173/176 |
| 6,431,289 B1 | * | 8/2002 | Potter et al. | 173/47 |
| 6,502,648 B2 | * | 1/2003 | Milbourne | 173/178 |
| 6,513,604 B2 | * | 2/2003 | Hanke | 173/48 |
| 6,536,536 B1 | * | 3/2003 | Gass et al. | 173/2 |
| 6,547,053 B2 | * | 4/2003 | Shih | 192/55.61 |
| 6,702,090 B2 | | 3/2004 | Nakamura et al. | |
| 6,729,812 B2 | * | 5/2004 | Yaksich et al. | 408/240 |
| 6,805,207 B2 | * | 10/2004 | Hagan et al. | 173/170 |

(Continued)

*Primary Examiner*—Rinaldi I. Rada
*Assistant Examiner*—Gloria R. Weeks
(74) *Attorney, Agent, or Firm*—Harness, Dickey & Pierce, P.L.C.

(57) ABSTRACT

A power tool generally includes a housing and a motor assembly connected to a transmission assembly. The motor assembly and the transmission assembly are secured against rotation in the housing. A plurality of protrusions extends from a component of the transmission assembly. The power tool further includes an output spindle and a spindle lock assembly that connects the output spindle to the transmission assembly. The spindle lock assembly includes an anvil, an outer ring member and a plurality of roller members. The roller members and the protrusions are disposed between the anvil and the outer ring member. An indicator member extends from the outer ring member. A compliant member connects the outer ring member to an interior portion of the housing. A scale is connected to an exterior portion of the housing, wherein the indicator member moves relative to the scale to indicate a value of torque at the output spindle.

18 Claims, 6 Drawing Sheets

U.S. PATENT DOCUMENTS

| | | | |
|---|---|---|---|
| 6,926,095 B2 * | 8/2005 | Chen ........................... 173/48 |
| 7,063,201 B2 | 6/2006 | Nakamura et al. |
| 7,101,300 B2 * | 9/2006 | Milbourne et al. .......... 475/265 |
| 7,124,839 B2 | 10/2006 | Furuta et al. |
| 7,182,148 B1 | 2/2007 | Szieff |
| 7,201,235 B2 * | 4/2007 | Umemura et al. ........... 173/217 |
| 7,220,211 B2 * | 5/2007 | Potter et al. ................. 475/298 |
| 7,222,862 B2 * | 5/2007 | Buchholz et al. ............ 279/19.3 |
| 7,308,948 B2 | 12/2007 | Furuta et al. |
| 7,377,331 B2 * | 5/2008 | Chen ......................... 173/93.5 |
| 2002/0121384 A1 * | 9/2002 | Saito et al. .................... 173/109 |
| 2003/0075347 A1 * | 4/2003 | Hanke ........................ 173/48 |
| 2005/0199404 A1 | 9/2005 | Furuta |
| 2006/0090913 A1 | 5/2006 | Furuta |
| 2007/0132196 A1 * | 6/2007 | Puzio et al. ................. 279/2.21 |
| 2007/0267207 A1 * | 11/2007 | Ito .............................. 173/217 |
| 2008/0060487 A1 * | 3/2008 | Schell ........................ 81/469 |

* cited by examiner

DRIVER WITH EXTERNAL TORQUE VALUE INDICATOR INTEGRATED WITH SPINDLE LOCK AND RELATED METHOD

CROSS-REFERENCE TO A RELATED APPLICATION

This application claims the benefit of U.S. Provisional Application No. 60/825,339, filed on Sep. 12, 2006. The above disclosure is hereby incorporated by reference as if fully set forth herein.

FIELD

The present teachings generally relate to power tools and more particularly relate to an external torque value indicator integrated with a spindle lock of a drill or driver.

BACKGROUND

Typically, a torque wrench is hand operated and used in a final tightening process to provide a desired torque on a coupling. The torque wrench, however, can be inefficient when tightening multiple couplings quickly. Typically, powered drivers can tighten a coupling to a predetermined torque value, but accuracy and repeatability of the desired torque value is typically less than that of the hand torque wrench. Moreover, on the powered drivers the desired torque value is not displayed to the user and the selectable torque setting does not always accurately correspond to desired torque value.

SUMMARY

The present teachings generally include a power tool including a housing and a motor assembly connected to a transmission assembly. The motor assembly and the transmission assembly are secured against rotation in the housing. A plurality of protrusions extends from a component of the transmission assembly. The power tool further includes an output spindle and a spindle lock assembly that connects the output spindle to the transmission assembly. The spindle lock assembly includes an anvil, an outer ring member and a plurality of roller members. The roller members and the protrusions are disposed between the anvil and the outer ring member. An indicator member extends from the outer ring member. A compliant member connects the outer ring member to an interior portion of the housing. A scale is connected to an exterior portion of the housing, wherein the indicator member moves relative to the scale to indicate a value of torque at the output spindle.

Further areas of applicability will become apparent from the description provided herein and the claims appended hereto. It should be understood that the description and specific examples are intended for purposes of illustration only and are not intended to limit the scope of the present teachings.

BRIEF DESCRIPTION OF THE DRAWINGS

The drawings described herein are for illustration purposes only and are not intended to limit the scope of the present teachings.

DETAILED DESCRIPTION

Figure 1:
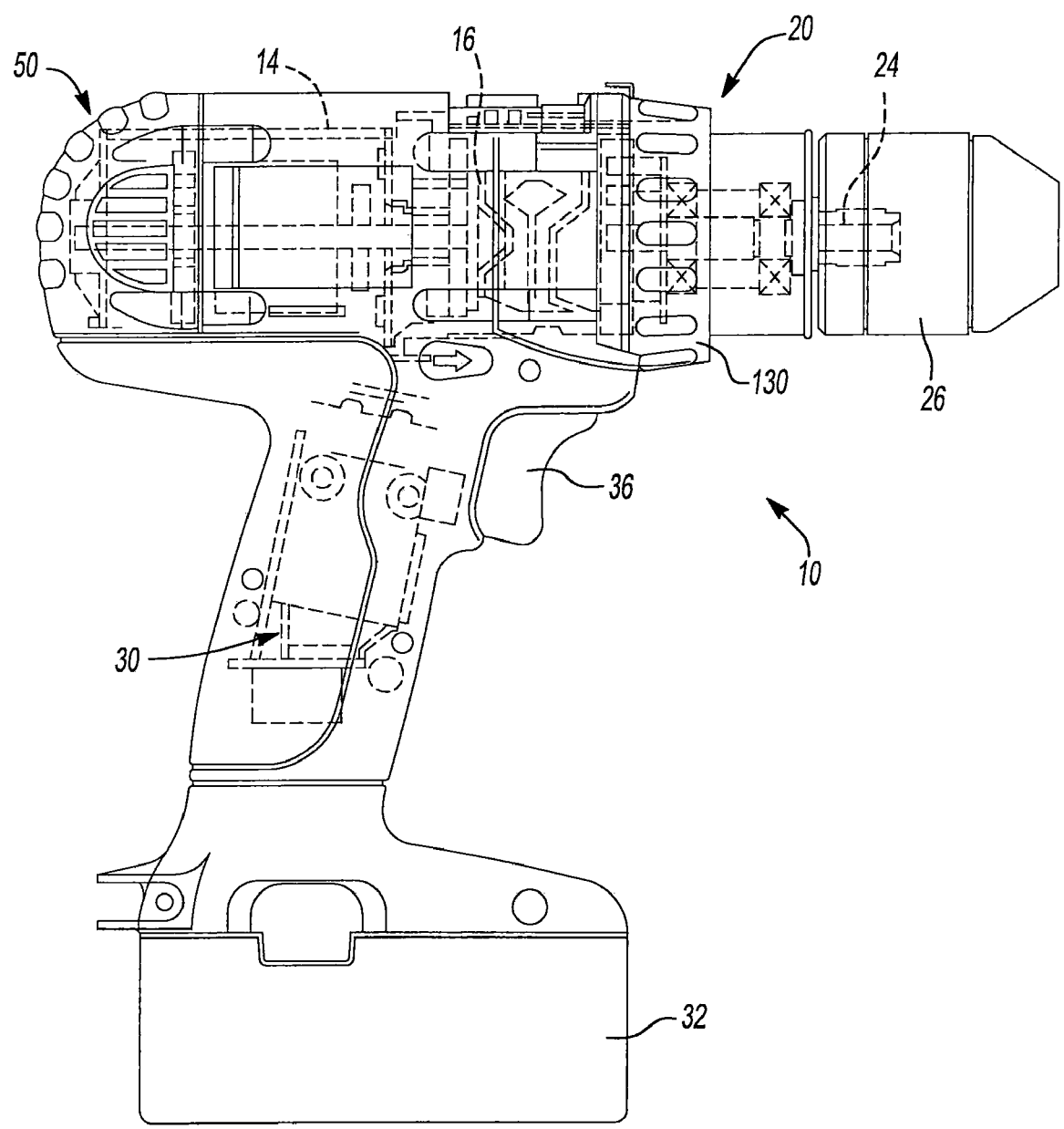
FIG. 1 is a side view of a power tool constructed in accordance with the present teachings.

The following description is exemplary in nature and is not intended to limit the present teachings, its application, or uses. It should be understood that throughout the drawings corresponding reference numerals indicate like or corresponding parts and features.

Figure 2:
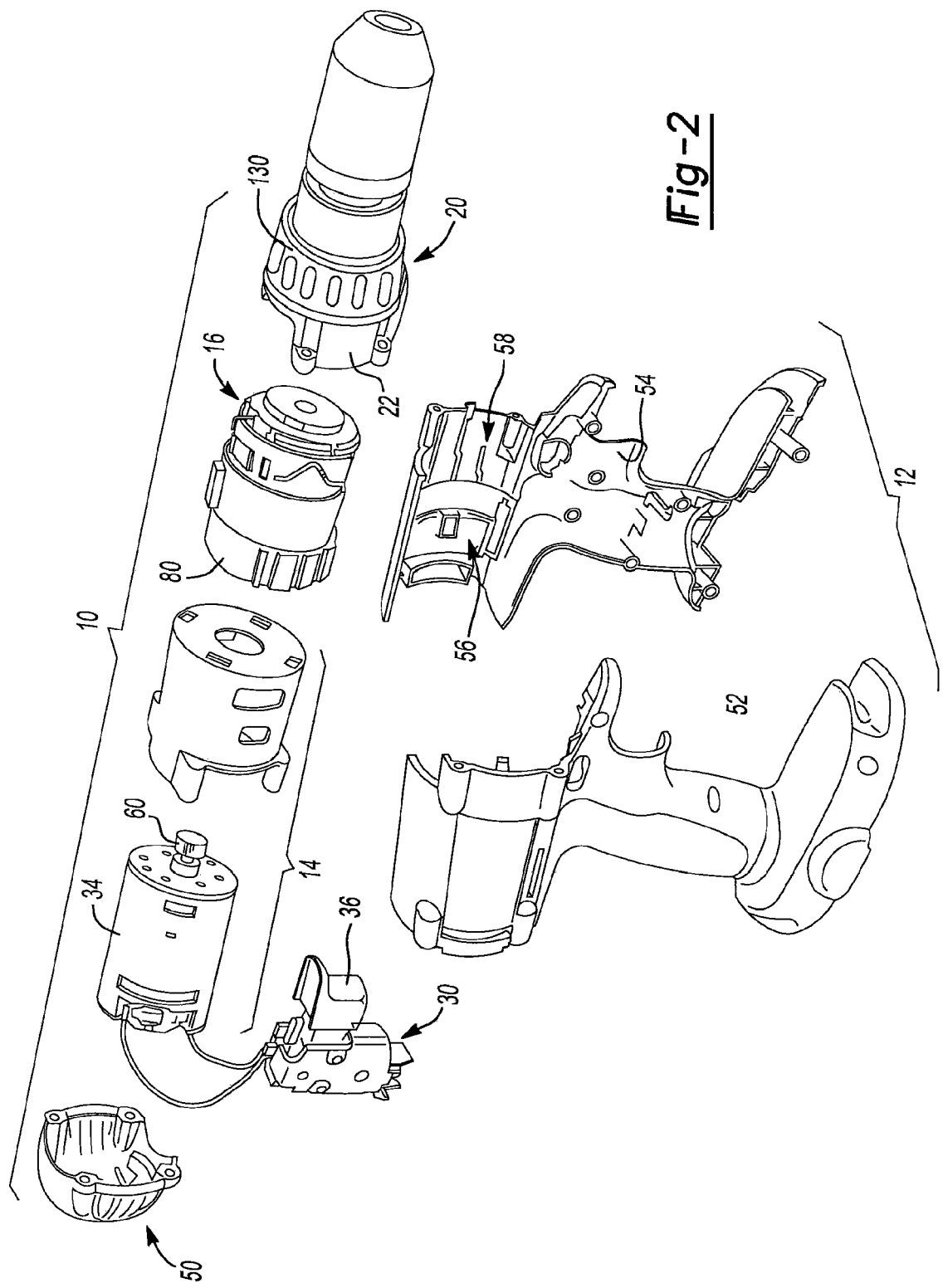
FIG. 2 is an exploded assembly view of a portion of the power tool of FIG. 1 showing a transmission assembly and a motor assembly in accordance with the present teachings.

With reference to FIGS. 1 and 2, a power tool constructed in accordance with the present teachings is generally indicated by reference numeral 10. Various aspects of the present teachings can be applicable to either a corded or a cordless (battery operated) device, such as a portable screwdriver (e.g., a stick driver) or a drill (e.g., drill, hammer drill and/or driver). In FIG. 1, the power tool 10 is illustrated as a cordless drill or driver having a housing 12 that can contain a motor assembly 14 connected to a multi-speed transmission assembly 16. A clutch mechanism 18 (FIG. 3) can selectively interrupt rotary power from the multi-speed transmission assembly 16 to an output spindle assembly 20.

The output spindle assembly 20 can be contained in a spindle housing 22 and can include an output spindle 24 that can connect to a chuck 26. A trigger assembly 30 can connect to the housing 12 and can be adjusted between an extended condition and a retracted condition. In addition, a battery pack 32 can be removably connected to the housing 12 when the power tool 10 is powered by one or more batteries. It will be appreciated in light of the disclosure that the corded driver can also be implemented with the present teachings and then the battery pack 32 can be omitted. Regardless of the power source, a motor 34 in the motor assembly 14 can be activated by moving a trigger 36 of the trigger assembly 30 into the retracted condition.

Figure 4:
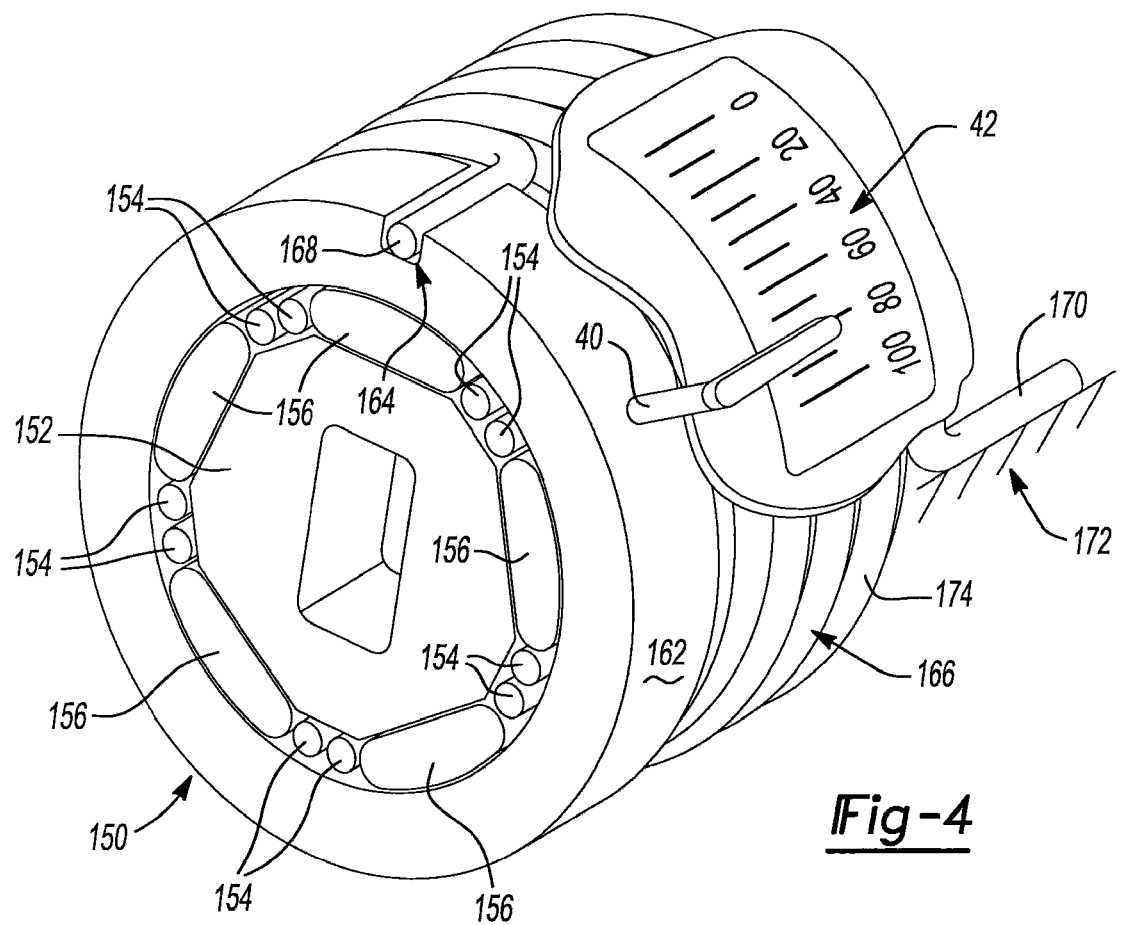
FIG. 4 is a perspective view of the spindle lock assembly having an indicator member extending from an outer ring member and pointing to an external torque value scale on a portion of the housing of the power tool of FIG. 1 in accordance with the present teachings.

An indicator member 40 can extend from a portion of the transmission assembly 16 and can be disposed over an external scale 42 (FIG. 4). The indicator member 40, by pointing to portions of the external scale 42, can be shown to indicate to a user a relatively precise value of torque at the output spindle 24. In one example, the user can manually rotate the housing 12 of the power tool 10, with the motor 34 deactivated, to drive a fastener to a desired torque level. The torque level can be indicated by the indicator member 40 on the external scale 42. In other examples, the user can drive a fastener to a desired torque level that can be indicated by the indicator member 40 on the external scale 42, while the user continues to drive the fastener with the motor 34 activated, in contrast to manually rotating the housing 12.

With reference to FIG. 2, the housing 12 can include an end cap assembly 50 and a pair of mating shells 52, 54. The housing 12 can define a motor cavity 56 and a transmission cavity 58. The motor assembly 14 can be housed in the motor cavity 56 and can include a rotatable output shaft 60 that can extend from the motor 34 and through a motor housing 62 to engage (and form a portion of) the transmission assembly 16.

Figure 3:
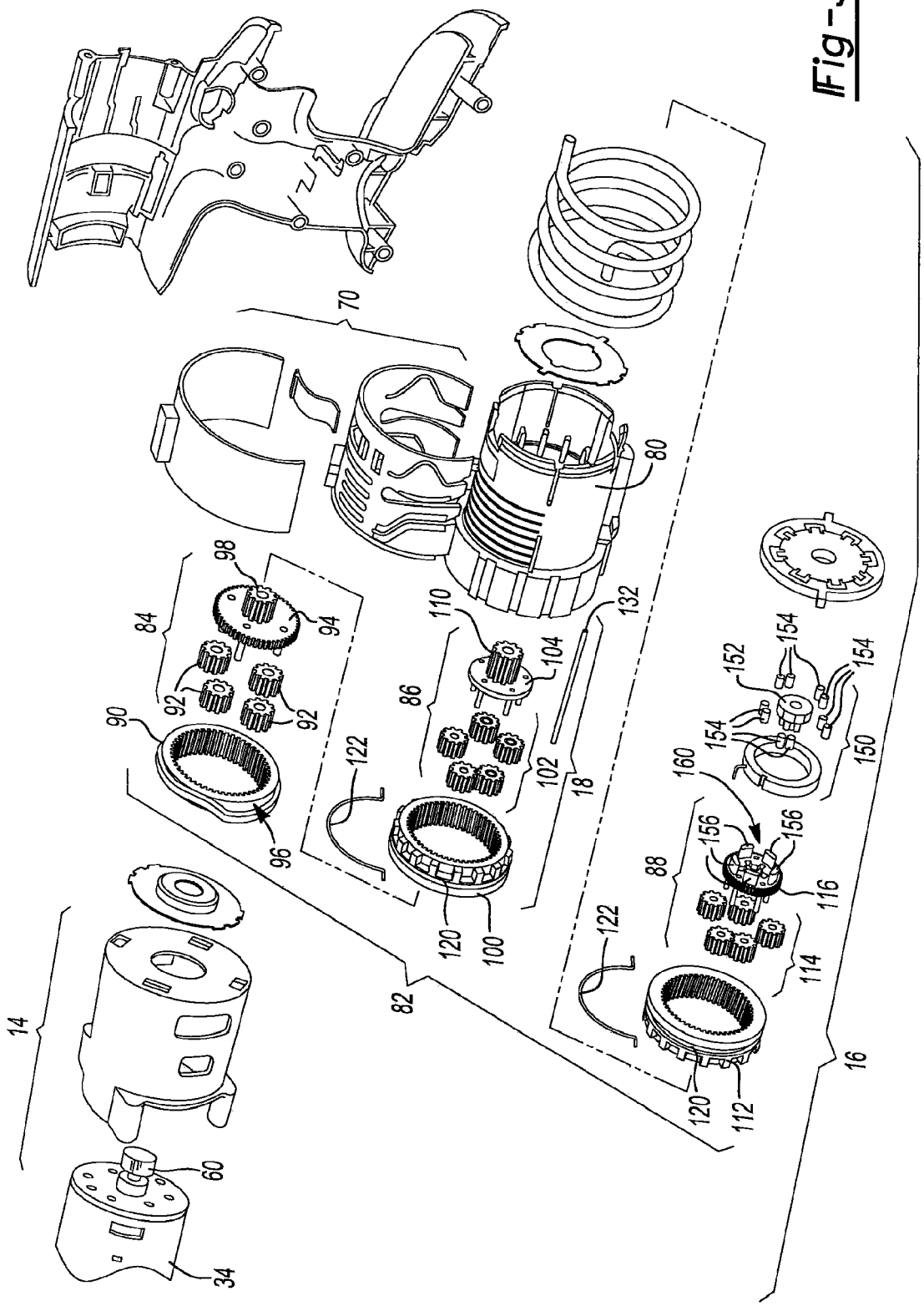
FIG. 3 is an exploded assembly view of the transmission assembly of FIG. 2 in accordance with the present teachings.

With reference to FIG. 3, the transmission assembly 16 can be housed in the transmission cavity 58 and can include a speed selector mechanism 70. The transmission assembly 16 can include a plurality of reduction elements or reduction gearsets that can be selectively engaged (and disengaged) by the speed selector mechanism 70 to provide a plurality of user-selectable speed ratios. The output from the transmission assembly 16 can be transmitted to the output spindle assembly 20 (FIG. 2). The chuck 26 (FIG. 2) can be incorporated in or coupled for rotation with the output spindle assembly 20 to permit torque to be transmitted to, for example, a tool bit (not shown). The clutch mechanism 18 can be included with the transmission assembly 16 and can be operable for limiting the magnitude of the torque associated with the drive input to a predetermined and selectable torque limit.

In one example, the transmission assembly 16 can be a three-stage, three-speed transmission that can include a transmission sleeve 80, a reduction gearset assembly 82 and the speed selector mechanism 70. The reduction gearset assembly 82 can include a first reduction gear set 84, a second reduction gear set 86 and a third reduction gear set 88. While each of the first, second and third reduction gear sets 84, 86, 88 can be planetary gear sets, it will be appreciated in light of the disclosure that various other types of reduction gear sets can be substituted for one or more of the reduction gear sets forming the reduction gear set assembly 82 such as a parallel shaft spur gear style transmission.

Briefly, the first reduction gear set 84 can include a first ring gear 90 and a first set of planet gears 92 that can connect to a first planet carrier 94. A clutch face 96 can be formed on a front face of the first ring gear 90. The second reduction gear set 86 can include a second sun gear 98, a second ring gear 100 and a second set of planet gears 102 that can connect to a second planet carrier 104. It will be appreciated that the output shaft 60 of the motor 34 can serve as a sun gear for the first reduction gearset 84. The third reduction gear set 88 can include a third sun gear 110, a third ring gear 112, a third set of planet gears 114 connected to a third planet carrier 116. The third sun gear 110 can be fixed for rotation with the second planet carrier 104.

Annular clip grooves 120 can be formed in the outer periphery of the second and third ring gear 100, 112. The clip grooves 120 can hold a portion of a wire clip 122. The wire clip 122 can connect to the speed selector mechanism 70 to move the ring gears 100, 112 to establish the speed ratios of the transmission assembly 16. While the speeds of the transmission assembly 16 can be adjusted with the speed selector mechanism 70, the magnitude of the clutch torque can be dictated by an adjustment mechanism 130 (FIG. 2). Positioning of the adjustment mechanism 130 at certain predetermined positions, can push a pin member 132 and can contact the clutch face 96. The clutch face 96 can operate to inhibit rotation of the first ring gear 90 relative to the transmission sleeve 80 when the magnitude of the clutch torque is at a first value. When the torque exceeds the first value, the first ring gear 90 can overcome the force of the pin member 132 on the clutch face 96 to permit the first ring gear 90 to rotate relative to the transmission sleeve 80. Additional details about the multi-speed transmission assembly 16 and the clutch mechanism 18 are disclosed in commonly assigned U.S. patent application Entitled "Housing and Gearbox for Drill or Driver" filed on Jun. 14, 2006, and assigned application Ser. No. 11/453,315, which is hereby incorporated by reference.

With reference to FIGS. 3 and 4, the power tool 10 (FIG. 1) can include a spindle lock assembly 150. The spindle lock assembly 150 can include an anvil 152, a plurality of roller elements 154 between projections 156 that can extend from a face 158 of a transmission component 160. In this example, the transmission component 160 can be the third planet carrier 116. The spindle lock assembly 150 can operate, in some aspects, similar to what is referred to as a sprag clutch. Additional details of a sprag clutch or automatic shaft lock are disclosed in commonly assigned U.S. Pat. No. 5,984,022 issued Nov. 16, 1999, which is hereby incorporated by reference.

More specifically, the spindle lock assembly 150 can be in a drive condition when, typically, the power tool 10 is used to insert a fastener, etc. In the drive condition, the spindle lock assembly 150 can "free wheel" and thus not interrupt rotational power through the spindle lock assembly 150. In a locked condition, however, the spindle lock assembly 150 can bind (i.e., move to a lock condition) and therefore, inhibit rotational power through the spindle lock assembly 150. In the lock condition, for example, the user can impart a force on the chuck 26 to secure a tool bit in the chuck 26. In doing so, the spindle lock assembly 150 can move into the lock condition to resist the force used to secure the tool bit in the chuck 26.

When the spindle lock assembly 150 is in the lock condition, the force imparted on the chuck 26 and/or the output spindle 24 can be transmitted to an outer ring member 162. Conventionally, an outer ring of the spindle lock can be secured to a housing against rotation. In the present teachings, however, the outer ring member 162 is able to rotate within the housing 12. To that end, the outer ring member 162 can further include an indentation 164 that can hold a portion of a spring 166. The outer ring member 162 is connected to the housing 12 via the spring 166 so that the force transmitted to the outer ring member 162 can compress the spring 166 between the outer ring member 162 and the housing 12.

More specifically, one end 168 of the spring 166 is held in the indentation 164 in the outer ring member 162 of the spindle lock assembly 150. An end 170 of the spring 166 (i.e., the other end) is secured to an interior portion 172 of the housing 12. By having the spring 166 disposed between the outer ring member 162 and the housing 12, the spring 166 is able to compress when a force in a rotation direction that causes the spindle lock assembly 150 to move into the lock condition is applied to the output spindle 24. In one aspect, the spring 166 can contained between the outer ring member 162 and the housing 12 in a compressed state regardless of the position of the outer ring member 162 relative to the housing 12. It will be appreciated in light of the disclosure that the spring 166 can be used in lieu of (or in addition to) one or more compliant members such as, but not limited to, suitable elastic material. Moreover, the spring 166 (or other suitable compliant member) can be arranged so that the movement of the outer ring member 162 can elongate the spring rather than compressing it.

The rotational force can be applied to the spindle lock assembly 150 when, for example, the user rotates the housing 12 of the power tool 10 (FIG. 1) to manually tighten the fastener or coupling. In this example, the user does not activate the motor 34. As the rotational force is applied to the spindle lock assembly 150, the outer ring member 162 will move and compress the spring 166 based on the load applied to the output spindle 24. The spring 166 can be configured and calibrated so that as the movement of the outer ring member 162 can be indicative of the torque applied to the output spindle 24.

With the movement of the outer ring member 162 being indicative of the torque applied to the output spindle 24, the indicator member 40 that can extend from the outer ring member 162 can be used to point to portions of the external scale 42. By pointing to portions of the external scale 42, a specific value of the torque at the output spindle 24 can be communicated to the user, while the user is rotating the housing 12. In one example, the external scale can provide tick marks and values indicative of a range of inch-pounds of torque applied to the output spindle 24.

In one example, the spring 166 is a wrap spring that has multiple coils 174 disposed around a portion of the transmission assembly 16. The wrap spring can be configured to encircle a portion of the transmission assembly 16. The wrap spring can also be configured to be disposed between the spindle lock assembly 150 and the transmission assembly 16. When the wrap spring encircles a portion of the transmission assembly 16, the housing 12 can be larger in a radial direction to accommodate the wrap spring. When the wrap spring is disposed between the transmission assembly 16 and the spindle lock assembly, the housing 12 can be larger in an axial direction to accommodate the wrap spring.

Figure 5:
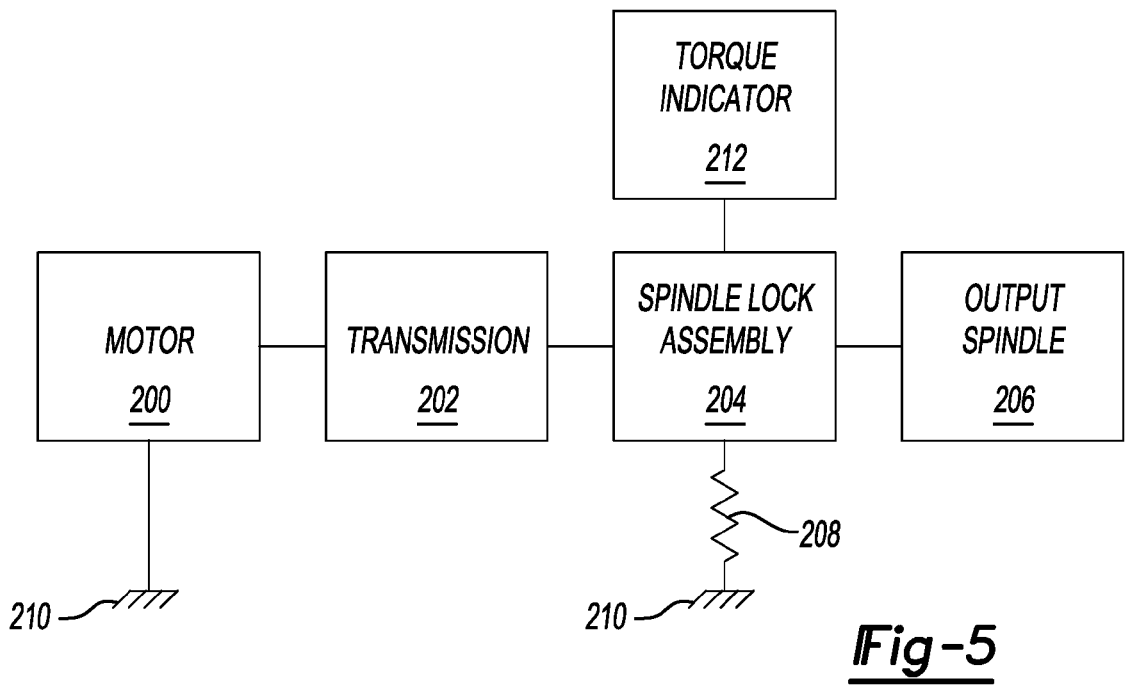
FIG. 5 is a diagram of components of a power tool showing a motor assembly and a transmission assembly connected to a housing and a spindle lock assembly connected to a spring that is connected to the housing in accordance with the present teachings.

With reference to FIG. 5, exemplary components of the power tool can be illustrated in a diagram in accordance with the present teachings. A motor 200 can drive a transmission 202. A spindle lock assembly 204 can connect an output spindle 206 to the transmission 202. The spindle lock assembly 204 is also shown with a spring 208 that can connect a portion of the spindle lock assembly 204 to a portion of the housing 210. The motor 200 and/or the transmission 202 can be directly connected to the housing 210 and thus cannot rotate relative to the housing 210. The portion of the spindle lock assembly 204 connected to the spring 208, however, can move to compress the spring 208, when a force is applied to the output spindle 206. In this regard, when the power tool is rotated to further drive the fastener or tighten a coupling, the portion of the spindle lock assembly 204 can move to compress the spring 208. The movement of the portion of the spindle lock assembly 204 and the spring 208 can be calibrated to indicate by a torque indicator 212 a value of torque at the output spindle 206. In this example, the manual rotation of the power tool to further drive the fastener or tighten the coupling is done while the motor 200 is not activated.

Figure 6:
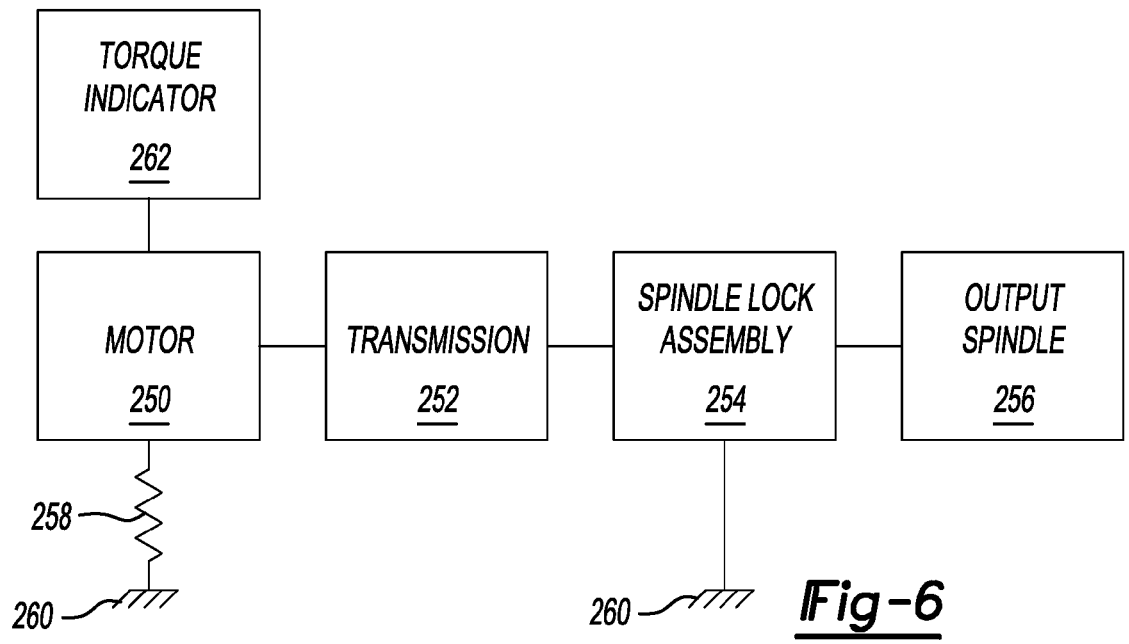
FIG. 6 is similar to FIG. 5 and shows a motor assembly and a transmission assembly connected to a spring that is connected to a housing and a spindle lock assembly connected directly to the housing in accordance with the present teachings.

With reference to FIG. 6, components of a power tool can be illustrated in a diagram in accordance with the present teachings. In this example, value of torque can be indicated to the user while the motor is activated. Specifically, a motor 250 can drive a transmission 252. A spindle lock assembly 254 can connect an output spindle 256 to the transmission 252. A spring 258 can connect the motor 250 and/or the transmission 252 to the housing 260 allowing the motor 250 and/or the transmission 252 to move relative to the housing 260. The spindle lock assembly 254, in contrast to the spindle lock assembly 204 (FIG. 5), is directly connected to a portion of the housing 260. The motor 250 and/or the transmission 252 can move to compress the spring 258, when a force is applied to the output spindle 256. In this regard, while the motor 250 is activated to drive the fastener or tighten the coupling, the motor 250 and/or the transmission 252 can move within the housing 260 to compress the spring 258. The movement of the motor 250 and/or the transmission 252 and the spring 258 can be calibrated to indicate by a torque indicator 262 a value of torque at the output spindle 206. In this example, the torque indicator 262 indicates a value of torque at the output spindle 256 while the motor 250 is activated to provide a real-time indication of the value of torque at the output spindle 256.

Figure 7:
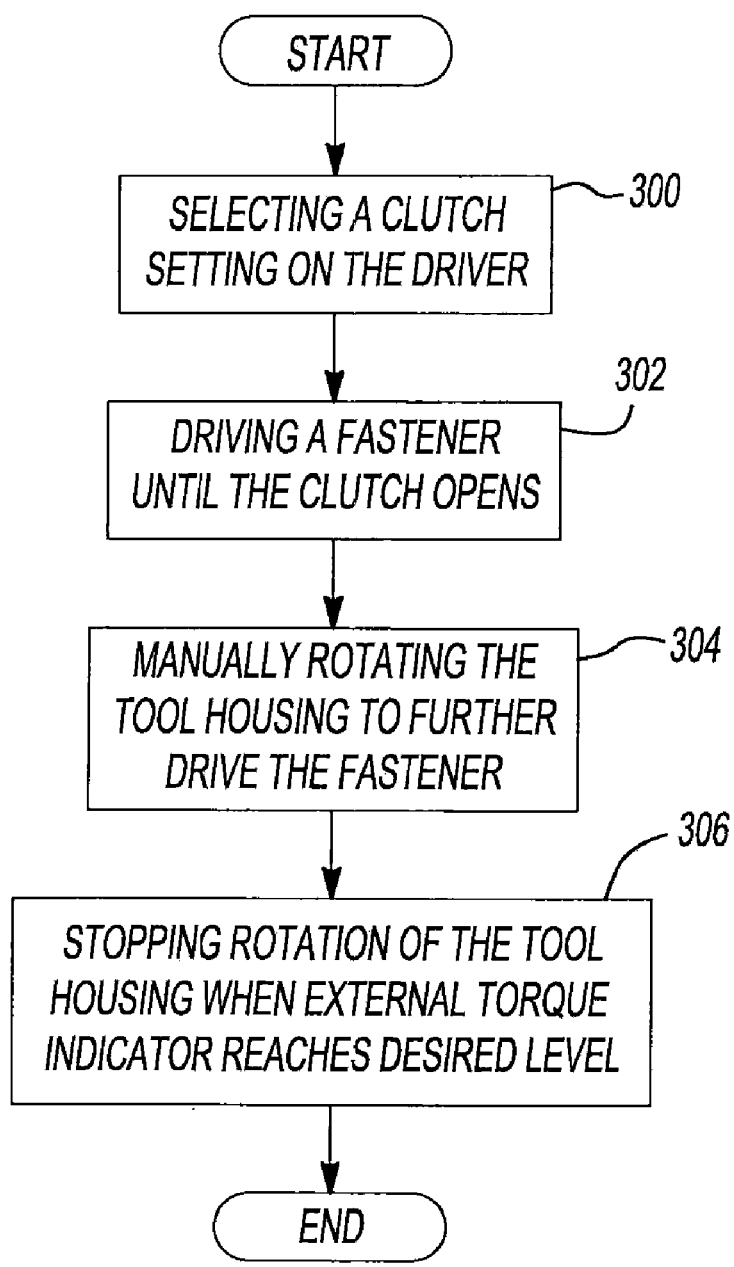
FIG. 7 is a flowchart showing an exemplary method of tightening a fastener or coupling by rotating a power tool to a desired torque level indicated on an external torque scale on the power tool in accordance with the present teachings.

With reference to FIG. 7, an exemplary method of using the power tool 10 in accordance with the present teachings includes, at 300, selecting a clutch setting with the adjustment mechanism 130 on the power tool 10. At 302, the user can drive the fastener or coupling until the power tool 10 clutches out. By clutching out, the clutch opens and rotational power from the motor 34 is reduced to (or removed from) the output spindle 24. At 304, the user can manually rotate the housing 12 of the power tool 10 to continue to drive the fastener or tighten the coupling against the spindle lock assembly being in the locked condition, while the motor is deactivated. At 306, the user can stop rotating the tool housing when the indicator member 40 indicates the desired torque level on the external scale 42.

While specific examples have been described in the specification and illustrated in the drawings, it will be understood by those skilled in the art that various changes can be made and equivalents can be substituted for elements thereof without departing from the scope of the present teachings as defined in the claims. Furthermore, the mixing and matching of features, elements and/or functions between various examples can be expressly contemplated herein so that one skilled in the art would appreciate from the present teachings that features, elements and/or functions of one example can be incorporated into another example as appropriate, unless described otherwise above. Moreover, many modifications can be made to adapt a particular situation or material to the present teachings without departing from the essential scope thereof. Therefore, it can be intended that the present teachings not be limited to the particular examples illustrated by the drawings and described in the specification as the best mode presently contemplated for carrying out this invention, but that the scope of the present disclosure will include any aspects following within the foregoing description and the appended claims.

What is claimed is:

1. A method comprising:
   rotating a housing of a power tool to rotate an output spindle of the power tool about an axis of rotation;
   moving a spindle lock assembly to a lock condition;
   compressing a spring member between the spindle lock assembly and the housing;
   moving an indicator member connected to the spindle lock assembly relative to the housing;
   indicating value of torque applied to the output spindle on an external scale on the housing with a portion of the indicator member that travels in an arcuate path disposed above the external scale in a direction that is perpendicular to the axis of rotation.

2. The method of claim 1, wherein the compressing of the spring member between the spindle lock assembly and the housing includes moving an outer ring member a distance that is proportional to the torque applied to the output spindle.

3. The method of claim 1 further comprising: further rotating the housing of the power tool to increase the torque applied to the output spindle of the power tool, wherein the portion of the indicator member moves relative to the external scale established on the housing to reflect the increase in torque applied to the output spindle.

4. The method of claim 1, wherein said indicator member includes a first and a second portion, said first portion extends in said direction that is perpendicular to said axis of rotation at a location where said first portion connects to said outer ring member, said second portion extends from said first portion in a direction that is parallel to said axis of rotation to terminate in front of said scale.

5. A power tool comprising:
a housing;
a motor assembly connected to a transmission assembly, wherein said motor assembly and said transmission assembly are secured against rotation in said housing;
a plurality of projections that extends from a component of said transmission assembly;
an output spindle rotatably supported in said housing and having an axis of rotation;
a spindle lock assembly that connects said output spindle to said transmission assembly, said spindle lock assembly includes an anvil, an outer ring member and a plurality of roller members, wherein said roller members and said projections are disposed between said anvil and said outer ring member;
an indicator member connected to said outer ring member, said indicator member having a portion that is disposed outside of said housing, said outer ring member disposed entirely inside said housing;
a compliant member that connects said outer ring member to an interior portion of said housing;
a scale established on an exterior portion of said housing, wherein said portion of said indicator member is disposed in front of said scale, said scale disposed radially beneath said portion of said indicator member, said portion of said indicator member moves relative to said scale to indicate a value of torque at said output spindle.

6. The power tool of claim 5, wherein said compliant member is a spring member with successive coils that wrap around a portion of said transmission assembly.

7. The power tool of claim 5, wherein said compliant member is a spring member with successive coils that are disposed between said transmission assembly and said output spindle.

8. The power tool of claim 5, wherein said component of said transmission assembly from which said plurality of projection extends includes a planet carrier of a planetary transmission.

9. The power tool of claim 5, wherein said compliant member is a spring member, wherein said spring member is in a compressed state regardless of an angular position of said outer ring member.

10. The power tool of claim 5, wherein said portion of said indicator member is operable to cross over said marks on said scale established on said housing to indicate an increase in torque applied to said output spindle.

11. The power tool of claim 5, wherein said indicator member includes a first and a second portion, said first portion extends in a direction that is perpendicular to said axis of rotation at a location where said first portion connects to said outer ring member, said second portion extends from said first portion in a direction that is parallel to said axis of rotation to terminate in front of said scale.

12. A power tool comprising:
a housing that contains a transmission assembly that connects an output spindle to a motor assembly;
a compliant member that connects one of said transmission assembly and said motor assembly to said housing;
a trigger assembly connected to said housing, said trigger assembly activates said motor assembly when said trigger assembly is in a retracted condition;
an indicator member that extends from one of said motor assembly and said transmission assembly and terminates above an exterior portion of said housing, said indicator member having a portion that is disposed outside of said housing, said motor assembly and said transmission assembly contained entirely in said housing;
a scale having marks established on said exterior portion of said housing beneath said portion of said indicator member, said portion of said indicator member disposed above said marks in a direction that is perpendicular to an axis of rotation of said output spindle, wherein said portion of said indicator member is operable to cross over said marks on said scale to indicate a value of torque at said output spindle.

13. The power tool of claim 12, further comprising:
a plurality of projections that extends from a component of said transmission assembly;
a spindle lock assembly that connects said output spindle to said transmission assembly,
wherein said spindle lock assembly includes an anvil, an outer ring member and a plurality of roller members,
wherein said spindle lock assembly is contained entirely inside said housing,
wherein said roller members and said projections are disposed between said anvil and said outer ring member,
wherein said outer ring member is secured to said housing.

14. The power tool of claim 13, wherein said component of said transmission assembly from which said plurality of projection extends includes a planet carrier member.

15. The power tool of claim 12, wherein said transmission assembly includes one of a planetary transmission and a parallel shaft spur gear transmission.

16. The power tool of claim 12, wherein said compliant member is a spring member, wherein said spring member is in a compressed state regardless of an angular position of said outer ring member.

17. The power tool of claim 12, wherein said portion of said indicator member is operable to cross over said marks on said scale established on said housing to indicate an increase in torque applied to said output spindle.

18. The power tool of claim 12, wherein said indicator member includes a first and a second portion, said first portion extends in said direction that is perpendicular to said axis of rotation at a location where said first portion connects to said outer ring member, said second portion extends from said first portion in a direction that is parallel to said axis of rotation to terminate above said scale.

* * * * *